(12) United States Patent
Newman et al.

(10) Patent No.: US 11,711,755 B1
(45) Date of Patent: Jul. 25, 2023

(54) SYSTEM AND METHOD FOR REMOTELY ASSESSING, ANALYZING, EVALUATING, AND RANKING MOBILE NETWORK OPERATOR AND COUNTRY COMPATIBILITY AGAINST MOBILE DEVICE SPECTRUM AND TECHNOLOGY CAPABILITIES

(71) Applicant: PrologMobile, Inc., Louisville, CO (US)

(72) Inventors: Jonathan Richard Newman, St. Augustine, FL (US); James Luke Heine, Prevessin-Moens (FR)

(73) Assignee: PrologMobile, Inc., Louisville, CO (US)

( * ) Notice: Subject to any disclaimer, the term of this patent is extended or adjusted under 35 U.S.C. 154(b) by 0 days.

(21) Appl. No.: 18/186,269

(22) Filed: Mar. 20, 2023

Related U.S. Application Data

(60) Provisional application No. 63/373,882, filed on Aug. 30, 2022.

(51) Int. Cl.
*H04W 48/16* (2009.01)
*H04W 8/18* (2009.01)
*H04W 48/18* (2009.01)

(52) U.S. Cl.
CPC ............ *H04W 48/16* (2013.01); *H04W 8/18* (2013.01); *H04W 48/18* (2013.01)

(58) Field of Classification Search
CPC ........ H04W 48/16; H04W 48/18; H04W 8/18
See application file for complete search history.

(56) References Cited

U.S. PATENT DOCUMENTS

| | | | |
|---|---|---|---|
| 2009/0233552 A1* | 9/2009 | Kim ...................... | G06F 1/3203 455/62 |
| 2023/0037997 A1* | 2/2023 | Vagelos ............... | H04W 48/16 |

* cited by examiner

*Primary Examiner* — Wayne H Cai
(74) *Attorney, Agent, or Firm* — Jason C. Cameron (57) ABSTRACT

A compatibility system for determining a technical compatibility of one or more electronic devices and one or more mobile network operators is disclosed. The compatibility system obtains data from a plurality of data sources and integrate the data to generate a platform that determines ability of at least one of: the electronic devices and the mobile network operators for a communication between each other. The compatibility system determines device attributes and network attributes by integrating the compatibility system with data related to electronic devices and mobile network operators respectively. The compatibility system evaluates radio bands supported by the electronic devices and mobile network operators and identifies potential carriers of the mobile network operators, and a plurality of known potential countries globally, which are compatible with the radio bands of the one or more electronic devices in order to determine the compatibility of the electronic devices and the mobile network operators.

20 Claims, 5 Drawing Sheets

SYSTEM AND METHOD FOR REMOTELY ASSESSING, ANALYZING, EVALUATING, AND RANKING MOBILE NETWORK OPERATOR AND COUNTRY COMPATIBILITY AGAINST MOBILE DEVICE SPECTRUM AND TECHNOLOGY CAPABILITIES

EARLIEST PRIORITY DATE

This Application claims priority from a Provisional patent application filed in the U.S. Patent Application No. 63/373,882, filed on Aug. 30, 2022, and titled "SYSTEMS AND METHODS FOR REMOTELY ASSESSING, ANALYZING, EVALUATING, AND RANKING/RECOMMENDING MOBILE NETWORK OPERATOR AND COUNTRY COMPATIBILITY AGAINST MOBILE DEVICE SPECTRUM AND TECHNOLOGY CAPABILITIES".

FIELD OF INVENTION

Embodiments of a present disclosure generally relate to data analytics system, and more particularly to a system and method for remotely assessing, analyzing, evaluating, and ranking mobile network operators and country compatibility against mobile device spectrum and technology capabilities.

BACKGROUND

The growing global market for used connected mobile devices (IMEI-based devices) is thriving, recording record year over year growth. The reuse of the mobile devices is expected to continue as a trend, with no end in sight. As a hallmark stage of this thriving circular economy, the mobile devices are collected through a variety of programs including at least one of: original equipment manufacturer (OEM) buy-backs, carrier trade-ins, buy back systems through retail or automated services including of retail counters, staffed or automated kiosks, and the like.

A subsequent stage to device collection is that the mobile devices are processed and redeployed into the nearest market, which is often a different market than that into which the mobile devices were first sold. This means that hundreds of millions of mobile devices are trafficked into markets, which were not originally designed to work in, specifically into countries and the mobile networks operated by cellular carriers for which the connected mobile devices were not originally intended and where the radio frequency capabilities of device modems may be misaligned.

A serious consequence of this activity is that many mobile devices, perhaps as many as 25% of the mobile devices cannot be successfully re-deployed upon re-distribution on the desired carrier, or any carrier in a specific region as a result of frequency mis-alignment, which can also affect mobile network contract and activation. The underlying issue causing this problem is that the radio/modem "profile" of supported radio frequencies in these mobile devices varies within the make/model nomenclature, causing these unforeseen problems.

In short, consumers think of mobile devices as monolithic in nature because the consumers share at least one of: the same make, model or even sub-names like model codes, and the like. Mobile devices, in particular Smartphones, that share at least one of: the same make, model name, model code, and the like do not necessarily have the same modem "profile". However, the above said information of the mobile devices are not visible to the consumers, and as a result, perpetuates this confusion and mis-alignment between the mobile devices and carriers.

This is an important problem which drives about 10 billion US dollars in product returns (i.e., return material authorization (RMAs)) due to failure to activate or even connect on re deployment to a new carrier network. Aside from the huge financial losses associated with this level product returns in the form of economic inefficiency, there is also a huge environmental impact as devices are returned, re-transacted, re-transported (i.e., being shipped from country to country), and re-sold again and again, presenting the same challenges of whether the transacted device's modem will be compatible with the next intended carrier network.

Further, for a better communication between the mobile device and cellular networks, a mobile network operator needs to understand if the mobile device with limited compatibility should be allowed (i.e., activated) on a specific network. For example, as the mobile network operator will be the service provider who is expected to ensure quality of service and respond to customer support queries and service related complaints. In such cases, the suitability of the mobile device to intemperate on the carrier's network has a direct influence on these relationships.

The mobile network operators may choose to not allow the mobile devices which the mobile network operators deem overly incompatible in terms of supported radio frequencies and technologies utilized for voice and data services on their networks, or may not activate specific mobile devices because the network realizes that an owner of the mobile devices (i.e., a consumer) is likely to experience bad service on the mobile device lacking core or critical compatibility between the network and device modems either in the form of applications that won't work, insecurity of data sent and received, limitations in supported bands, limited data connection speeds, and the like, such that the mobile device may not work in certain regions within a nation as manifested by limited compatible signal (i.e., lack of coverage), slow download speeds, poor audio quality, bad video quality, and the like. In short, carriers of the mobile network operator may not want partially-compatible mobile devices on their networks because the mobile network operator may know that the mobile device will not perform well with these identifiable limitations, and the mobile network operators do not want the consumer to blame them for the bad experience forecasted.

Hence, there is a need for an improved system and method for determining compatibility of mobile devices and carriers of the mobile network operators, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the disclosure, a compatibility system for determining a technical compatibility of one or more electronic devices and one or more mobile network operators is disclosed. The compatibility system includes a hardware processor, and a memory coupled to the hardware processor. The memory includes a set of program instructions in the form of a plurality of subsystems that are configured to be executed by the hardware processor. The compatibility system obtain data related to at least one of: device modem spectrum assignments and modem capabilities from a plurality of data sources and integrate the data to generate a platform providing at least one of: information and data-driven insights on a plurality of factors that determine ability of at least one of: the one or more electronic devices and the one or more mobile network operators for a communication between the one or more electronic devices and the one or more mobile network operators.

The compatibility system determines device attributes representing capabilities of the one or more electronic devices for operating on a cellular network by integrating the compatibility system with data related to the one or more electronic devices obtained from a plurality of external device data providers. The compatibility system determines network attributes representing capabilities of the one or more mobile network operators by integrating the compatibility system with data related to the one or more mobile network operators obtained from a plurality of external operator data providers.

The compatibility system evaluates radio bands that are supported by the one or more electronic devices based on at least one of: an international mobile equipment identity (IMEI) of the one or more electronic devices, and the integration with data related to the one or more electronic devices obtained from a plurality of external device data providers. The radio bands are evaluated by combining the plurality of data sources that authoritatively and exhaustively represent the capabilities of the one or more electronic devices based on at least one of: spectrum usage, utilization of technologies for efficiency in connectivity. The compatibility system evaluate radio bands that are supported by the one or more mobile network operators based on device information.

The compatibility system identifies at least one of: a plurality of known potential carriers of the one or more mobile network operators, and a plurality of known potential countries globally, which are compatible with the radio bands of the one or more electronic devices. The compatibility system further determines the compatibility of at least one of: the one or more electronic devices and the one or more mobile network operators by utilizing radio band capability data that include the radio bands supported by the one or more electronic devices. When the plurality of potential carriers of the one or more mobile network operators require a radio capability in provision of network access including at least one of: mobile roaming, activation of contract, and provisions of services to the one or more electronic devices, which enables evaluation of the one or more electronic devices to be utilized on any cellular network in the compatibility system.

In one aspect, a method for determining a technical compatibility of one or more electronic devices and one or more mobile network operators is disclosed. The method includes following steps: (a) obtaining, by a hardware processor, data related to at least one of: device modem spectrum assignments and modem capabilities from a plurality of data sources and integrate the data to generate a platform providing at least one of: information and data-driven insights on a plurality of factors that determine ability of at least one of the one or more electronic devices and the one or more mobile network operators for a communication between the one or more electronic devices and the one or more mobile network operators; (b) determining, by the hardware processor, device attributes representing capabilities of the one or more electronic devices for operating on a cellular network by integrating the compatibility system with data related to the one or more electronic devices obtained from a plurality of external device data providers; (c) determining, by the hardware processor, network attributes representing capabilities of the one or more mobile network operators by integrating the compatibility system with data related to the one or more mobile network operators obtained from a plurality of external operator data providers; (d) evaluating, by the hardware processor, radio bands that are supported by the one or more electronic devices based on at least one of: an international mobile equipment identity (IMEI) of the one or more electronic devices, and the integration with data related to the one or more electronic devices obtained from a plurality of external device data providers (e) evaluating, by the hardware processor, radio bands that are supported by the one or more mobile network operators based on device information; (f) identifying, by the hardware processor; at least one of: a plurality of known potential carriers of the one or more mobile network operators, and a plurality of known potential countries globally, which are compatible with the radio bands of the one or more electronic devices; and (g) determining, by the hardware processor, the compatibility of at least one of: the one or more electronic devices and the one or more mobile network operators by utilizing radio band capability data that include the radio bands supported by the one or more electronic devices.

In another aspect, a non-transitory computer-readable storage medium having instructions stored therein that when executed by a hardware processor, cause the processor to perform steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DRAWINGS

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1:
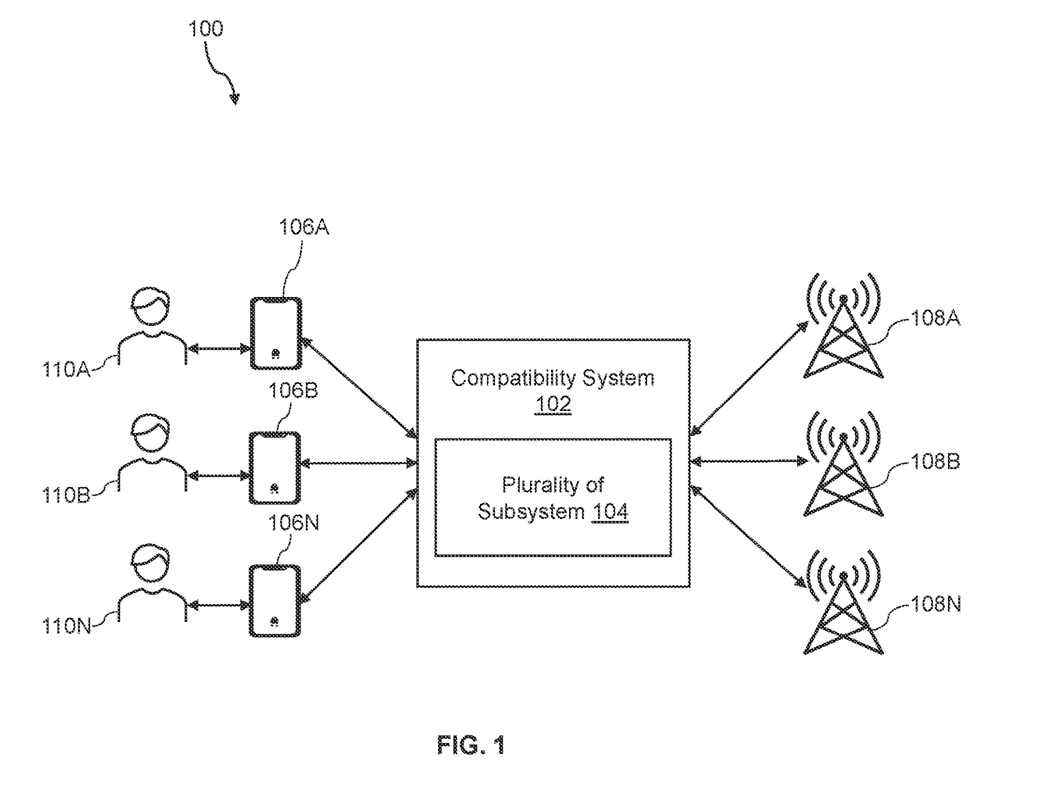
FIG. 1 is a block diagram of a compatibility system fix determining a technical compatibility of one or more electronic devices and carriers of one or more mobile network operators, in accordance with an embodiment of the present disclosure.

FIG. 1 is a block diagram 100 of a compatibility system 102 for determining a technical compatibility of one or more electronic devices 106A-N and carriers of one or more mobile network operators 108A-N, in accordance with an embodiment of the present disclosure. The compatibility system 102 is implemented to remotely recognize, evaluate, and analyze spectrum utilization of both the one or more electronic devices 106A-N (i.e., one or more mobile devices 106A-N) and either the one or more mobile network operators 108A-N or at least one of: a specific geographical location, a country's known collection of the one or more mobile network operators 108A-N, a region of multiple countries, and the like, to support life cycle decisions regarding interoperability of the one or more electronic devices 106A-N on the one or more mobile network operators 108A-N worldwide. The compatibility system 102 provides life cycle expansion, transparency in market applicability, lowered cost of transactions, lowered cost of ownership, and improved transactional efficiencies, including environmentally associated transaction costs and risks, which all help in re-sale of the one or more electronic devices 106A-N and users who process the one or more electronic devices 106A-N for reuse or recycling.

The compatibility system 102 may be a data analytics platform for the supply chain of the one or more electronic devices 106A-N, which creates unparalleled transparency and reduces multiple points risks relating to the presence and nature of electronic device-based attributes that are not easily revealed, and the electronic device-based attributes present points of risk without visibility. The compatibility system 102 technically solves the problem of device compatibility at both the carriers of the one or more mobile network operators 108A-N and geographical levels of neighborhood, city, country, and even multi-country regions using a plurality of subsystems 104 by matching each international mobile equipment identity (IMEI) based modem profile (i.e., cellular modem) of the one or more electronic devices 106A-N with mobile radio frequency licensing and deployment data on carrier networks globally.

In other words, the IMEI based modem profile of the one or more electronic devices 106A-N is tracked and run against a series of mobile network profiles to gauge both quantitatively and qualitatively fit between the one or more electronic devices 106A-N and the available technological topologies, radio frequencies and antennae density of the networks owned by the one or more network operators 108A-N. Though, the modem profile on the one or more electronic devices 106A-N is static, cellular networks of the one or more mobile network operators 108A-N are dynamic as mobile networks are constantly transitioning and upgrading network equipment, impacting the topology including at least one of: global system for mobile communication (GSM), code division multiple access (CDMA), third generation (3G), third generation (4G), fifth generation (5G), sixth generation (6G), and the like and technologies, as well as licensing/buying or re-purposing radio frequency spectrum from governments to support faster network speeds and also to improve signal coverage within each localized region, country, and collection of countries of operation.

The evolution of the cellular networks and their respective technologies is done through conformance to globally adopted standards via consortiums including third generation partnership project (3GPP), European Telecommunications Standards Institute (ETSI), and other industry bodies as well as through international and inter-governmental bodies including the International Telecommunications Union (ITU), a coordinating body of the United Nations. The evolution and standards adopted by network operators may include the use of both licensed and unlicensed radio frequency spectrum, outdoor as well as indoor antenna broadcast and reception methods, the use of multiple input multiple output (MIMO), voice over LTE (VoLTE), dual connectivity, carrier aggregation and other techniques to improve the efficiency, quality and throughput of data transmission while also increasing the reliability of data connections within the network and network roaming partnerships.

The compatibility system 102 determines the technical compatibility of the one or more electronic devices 106A-N (i.e., the electronic devices 106 that connect to other services through a cellular network based on certain parameters) and the one or mobile network operators 108A-N (service providers offering data communications over mobile telephony protocols to the one or more electronic devices 106A-N). The abilities (i.e., operating parameters) of the one or more electronic devices 106A-N to establish a connection to the one or more mobile network operators 108A-N and interoperate on a mobile network are compared with ability of the mobile network in order to enable services based on the license the network operator 108 having for technical capabilities of the antenna and tower infrastructure to operate.

Further, the evaluation of the device compatibility is achieved when the capabilities of the one or more electronic devices 106A-N (i.e., a modem profile support of radio frequency bands as well as a technical protocol support including MIMO, VoLTE, and the like) are compared with the capabilities of a carrier, a group of carriers, the group of one or multiple carriers in a country, and one or multiple carriers in a collection of countries. With compatibility both on a quantitative and qualitative scale, benefits include assessment of a fit of the one or more electronic devices 106A-N for voice, data, roaming, pre-paid and post-paid contract potential, customer service support, and other aspects of device interoperability within the one or more mobile network operators 108A-N in a specific region.

In an embodiment, the one or more electronic devices 106A-N may be a mobile phone, a Smartphone, a personal computer, a notebook, and the like. In another embodiment, the compatibility system 102 may be installed in a server. In an embodiment, the server may be act as master for the compatibility system 102, which hosts/distributes the application. The sever may include an access to proprietary and public databases. Further, the server may include an access to data storage, an intermediary host including a user personal computer (PC) to provide access to the internet for connection to the server, and also to provide a capable user interface, the electronic device, which is subject for assessment, to the user 110A-N (i.e., the owner of the one or more electronic devices 106A-N and customer to the provider), and the provider (i.e., the owner or licensee of the system/application and service provider to the user 110A-N.

Figure 2:
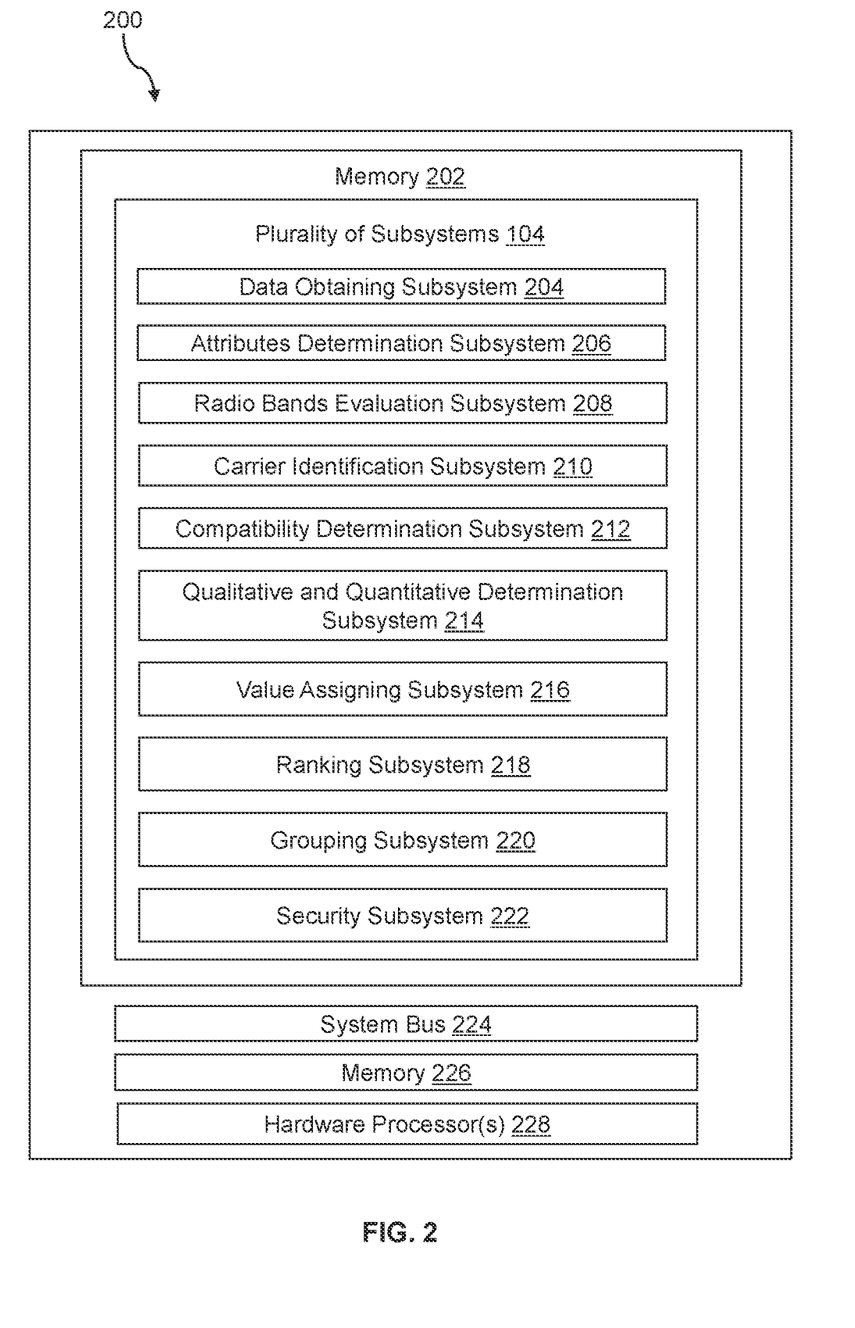
FIG. 2 is an exploded view of the compatibility system, such as those shown in FIG. 1, in accordance with an embodiment of the present disclosure.

FIG. 2 is an exploded view 200 of the compatibility system 102, such as those shown in FIG. 1, in accordance with an embodiment of the present disclosure. The compatibility system 102 includes a hardware processor 228. The compatibility system 102 also includes a memory 202 coupled to the hardware processor 228. The memory 202 includes a set of program instructions in the firm of the plurality of subsystems 104.

The hardware processor(s) 228, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes the plurality of subsystems 104 stored in the form of executable program which instructs the hardware processor 228 via a system bus 224 to perform the above-mentioned method steps. The plurality of subsystems 104 include a data obtaining subsystem 204, an attributes determination subsystem 206, a radio bands evaluation subsystem 208, a carrier identification subsystem 210, a compatibility determination subsystem 212, a qualitative and quantitative determination subsystem 214, a value assigning subsystem 216, a ranking subsystem 218, a grouping subsystem 220, and a security subsystem 222.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor(s) 228.

The compatibility system 102 includes the data obtaining subsystem 204 that is communicatively connected to the hardware processor 228. The data obtaining subsystem 204 obtains data from a plurality of data sources. The data obtained from the plurality of data sources may represent a plurality of attributes related to a connectivity capabilities of the one or more electronic devices 106A-N. The plurality of attributes may include at least one of: device modem spectrum assignments (i.e., unchangeable after modem production), modem capabilities that affect data throughput and efficiency (i.e., QAM and MIMO) across various technical generations of cellular technologies (i.e., GSM/2G, UMTS/3G, LTE/4G, NR/5G, and the like). In an embodiment, the plurality of data sources around networks may involve the cellular technologies within each country across 200 regions and countries globally.

The data obtaining subsystem 204 further integrates the data to generate a platform providing at least one of: information and data-driven insights on a plurality of factors that determine ability of the one or more electronic devices 106A-N to connect to the one or more mobile network operators 108A-N. The compatibility system 102 includes a database that stores the data obtained from the plurality of data sources. Generally, data summaries of the one or more electronic devices 106A-N and the one or more mobile network operators 108A-N are placed in snapshots or summary tables in the database. The device data requires only periodic refreshing when a new data source is implemented. The one or more mobile network operators 108A-N require regular refreshing to encapsulate changes in a network structure and technologies such as the emergence of 5G across new cities in a given country in the preceding month(s). The information is derived from an overwhelmingly large set of raw network observation data, and so abstraction, reduction and summarizing the data is a requirement. Based on the snapshot data summaries, the compatibility system 102 identifies changes in 5G adoption, migration of 2G and 3G spectrum use to 4G/LTE, rapidly changing countries, and the like through dashboards, which may influence compatibility outcomes and send the compatibility outcomes with service users.

In an embodiment, the plurality of factors may include a device matching that refers to a combination of fixed device attributes and other device attributes matches against the network capabilities (i.e., the spectrum used in the network and the use of efficiency techniques including MIMO and QAM to provide higher data throughput and increased quality of service in the coverage area in a country). In an embodiment, the majority of device attributes are unknown to the customer 110A-N (i.e., the user 110A-N) as the device attributes represent cellular signalling, encrypted data, geographically dispersed but likely un-noticed technological implementation.

In an embodiment, the compatibility system 102 can be updated manually for a specific carrier of the one or more mobile network operators 108A-N. In other words, the compatibility system 102 is designed to allow revisions on a manual basis for the specific carrier. In another embodiment, the compatibility system 102 is designed to allow periodic renewal of data points in the compatibility system 102. In yet another embodiment, the compatibility system 102 is further designed to allow previously unavailable data points to be input into the compatibility system 102.

The data obtaining subsystem 204 further obtains data from the plurality of data sources to generate the platform providing at least one of: information and data-driven insights on a plurality of factors that determine ability of the one or more mobile network operators 108A-N for establishing a communication to the one or more electronic devices 106A-N. The compatibility system 102 further includes the attributes determination system 206 that is communicatively connected to the hardware processor 228. The attributes determination system 206 determines device attributes of the one or more electronic devices 106A-N by integrating the compatibility system 102 with data related to the one or more electronic devices 106A-N obtained from a plurality of external device data providers.

In an embodiment, the device attributes of the one or more electronic devices 106A-N represent capabilities of the one or more electronic devices 106A-N for operating on a cellular network. In another embodiment, the device attributes of the one or more electronic devices 106A-N may include at least one of: ace of the one or more electronic devices 106A-N, presence of the third generation partnership project (3GPP) standards supported by the device chipsets and modem, spectrum capabilities of the one or more electronic devices 106A-N, and characteristics and attributes causing communication capabilities of the one or more electronic devices 106A-N.

The attributes determination system 206 further determines network attributes of the one or more mobile network operators 108A-N by integrating the compatibility system 102 with data related to the one or more mobile network operators 108A-N obtained from a plurality of external operator data providers. In an embodiment, the network attributes may represent the capabilities of the one or more mobile network operators 108A-N. In another embodiment, the network attributes of the one or more mobile network operators 108A-N may include at least one of: spectrum utilization, presence of 3GPP technologies supported by the one or more mobile network operators 108A-N and a network of broadcast antenna and tower infrastructure of the one or more mobile network operators 108A-N, and characteristics and attributes causing communication capabilities of the one or more mobile network operators 108A-N.

The compatibility system 102 further includes the radio bands evaluation subsystem 208 that is communicatively connected to the hardware processor 228. The radio bands evaluation subsystem 208 determines and evaluates radio bands that are supported by the one or more electronic devices 106A-N based on at least one of: an international mobile equipment identity (IMEI) of the one or more electronic devices 106A-N, and the integration with data related to the one or more electronic devices 106A-N obtained from a plurality of external device data providers. The radio bands evaluation subsystem 208 evaluates the radio bands that are supported by the one or more electronic devices 106A-N by combining the plurality of data sources that that authoritatively and exhaustively represent the capabilities of the one or more electronic devices based on at least one of: spectrum usage, utilization of technologies for efficiency in connectivity (i.e., QAM and MIMO).

Further, the radio bands evaluation subsystem 208 assesses an optimization level for a specific spectrum used in the one or more electronic devices 106A-N. These are data points that are not available to the user 110A-N of the one or more electronic devices 106A-N, and of a technical nature beyond a user-presented documentation and manuals for the users 110A-N. Similarly, the radio bands evaluation subsystem 208 combines the plurality of data sources about the one or more network operators 108A-N to allow attribute matching and quantitative and qualitative assessment of the match quality between the one or more electronic devices 106A-N and the one or more network operators 108A-N The radio bands evaluation subsystem 208 further determines and evaluates radio bands that are supported by the one or more mobile network operators 108A-N based on device information. Typically, the visibility of a owner (i.e., the user 110A-N) of the one or more electronic devices 106A-N helps to identify the one or more electronic devices 106A-N, which is normally limited to Brand, Model, and a variant configuration (e.g., an Apple (brand) iPhone 13 Pro (model) of sub-model A2638 with variant configuration of 256 gigabyte of memory and the color blue) of the one or more electronic devices 106A-N.

The radio bands evaluation subsystem 208 identifies technical device attributes and capabilities that are invisible to the human eye. The presence or lack of these device attributes and capabilities may enable or prohibit the one or more electronic devices 106A-N from being able to connect to any specific network operator 108A-N. Protocols for such connection to the network operator 108A-N (i.e., "attaching") are well defined globally by the 3GPP bodies and supported by manufacturers of the one or more electronic devices 106A-N and network equipment to ensure correct operation, yet again are outside the visibility of users 110A-N and require highly sophisticated spectrum monitoring requirement in order to observe. In an embodiment, other device information, aside from spectrum, may include the device locks, carrier locks, financial encumbrances, and lost/stolen (i.e., crime report filings), which are also available from various data services of the compatibility system 102, and are not observable to the user 110A-N or someone holding the one or more electronic devices 106A-N. The compatibility system 102 utilizes the device information to evaluate the connectivity potential (e.g., in the case of the United States, on which of the major networks (i.e., AT&T, T-Mobile, Verizon, etc. which all have varied and different use of spectrum per the Federal Communications Commission (FCC)) have a specific device that includes the maximized compatibility).

The radio bands evaluation subsystem 208 further identifies points of spectrum compatibility of at least one of: the one or more electronic devices 106A-N and the one or more network operators 108A-N. The radio bands evaluation subsystem 208 further identifies points of non-spectrum compatibility of at least one of: the one or more network devices 106A-N and the one or more mobile network operators 108A-N to support standards-compliant transmission. The radio bands evaluation subsystem 208 further evaluates and provides a summary score indicating an overall output of device to network compatibility.

The compatibility system 102 further includes the carrier identification subsystem 210 that is communicatively connected to the hardware processor 228. The carrier identification subsystem 210 identifies at least one of: a plurality of known potential carriers of the one or more mobile network operators 108A-N, and a plurality of known potential countries globally, which are compatible with the radio bands of the one or more electronic devices 106A-N. In an embodiment, the carrier identification subsystem 210 utilizes modem band data tables from the one or more electronic devices 106A-N and data sources including of the device attributes that include at least one of: band data, network technologies, and technical capabilities of each electronic device 106 in the compatibility system 102. In an embodiment, information of at least one of: the plurality of known potential carriers of the one or more mobile network operators 108A-N, and the plurality of known potential countries are related to the compatibility system 102 through at least one of: PhoneSpection Reports, web-based user interfaces, app-based user interfaces, application programming interface (API) based services, and the like.

The compatibility system 102 further includes the compatibility determination subsystem 212 that is communicatively connected to the hardware processor 228. The compatibility determination subsystem 212 determines the compatibility of at least one of: the one or more electronic devices 106A-N and the one or more mobile network operators 108A-N by utilizing radio band capability data that include the radio bands supported by the one or more electronic devices 106A-N. When the plurality of potential carriers of the one or more mobile network operators 108A-N require a radio capability in provision of network access including at least one of: mobile roaming, activation of contract, and provisions of services to the one or more electronic devices 106A-N, which enables evaluation of the one or more electronic devices 106A-N to be utilized on any cellular network in the compatibility system 102.

The compatibility system 102 further includes the qualitative and quantitative subsystem 214 that is communicatively connected to the hardware processor 228. The qualitative and quantitative subsystem 214 determine at least one of a qualitative match score and a quantitative match score for the one or more electronic devices 106A-N based on the device attributes of the one or more electronic devices 106A-N with respect to the network attributes of the one or more mobile network operators 108A-N using an algorithm. In an embodiment, the algorithm used to determine at least one of: a qualitative match score and a quantitative match score is a matching algorithm. In an embodiment, there are different types of algorithms used in the compatibility system 102 for determining technical compatibility of one or more electronic devices 106A-N. Typically, in aggregation and synthesis of data regarding both one or more electronic devices 106A-N and the one or more network operators 108A-N, the matching algorithm is used to identify whether varied data points are similar in order to account for variations in spelling and/or punctuation in order to create the profiles of the one or more electronic devices 106A-N and the one or more network operators 108A-N. The matching algorithm may include but not limited to tokenization at character and work level, and may identify the Levenshtein Distance between two sets of token being evaluated.

The matching algorithm in the compatibility system 102 is utilized to match the attributes of the one or more electronic devices 106A-N with the attributes of the one or more network operators 108A-N. The majority of the technical attributes of the one or more electronic devices 106A-N do not evolve and the technical attributes are fixed in production process, and as such, in a collaborative filtering algorithm (i.e., a classic item-based filter). In an embodiment, some attributes of the one or more electronic devices 106A-N may include latent features that are already included in the one or more electronic devices 106A-N but not activated without a firmware upgrade, or the age of the device, do adapt over time, in many cases representing a time-based degradation, particularly as compared to a mobile network. Each mobile network can be likened to an adaptive organism that expands or contracts, adopting new technologies, spectrum, towers, and the like in response to its market ecosystem. There are attributes of the one or more network operators 108A-N that are used in item-based filtering that filters the spectrum of the one or more network operators 108A-N. This results misaligned spectrum matches that are fundamental connectivity obstacles. In an embodiment, other attributes including QAM and MIMO capabilities are user preference filters, wherein the one or more network operators 108A-N can connect with 2×2 MIMO, or 4×4 MIMO, or even without MIMO. However the one or more network operators 108A-N can express a preference for inclusion or exclusion of such attributes in the matching algorithm.

In an embodiment, the algorithm used to determine at least one of: the qualitative match score and the quantitative match score are multi-variate and adaptable as technical standards supported in at least one of: the one or more electronic devices 106A-N, components including the device chipsets, and the modems of the one or more electronic devices 106A-N, the one or more mobile network operators 108A-N, components comprising antennae, spectrum, technologies of the one or more mobile network operators 108A-N, and international standards governing global spectrum and technology use standards including 3GPP, ETSI, and ITU are continue to evolve due to technological progress.

The qualitative and quantitative subsystem 214 further measures at least one of: qualitative fit and quantitative fit of the one or more electronic devices 106A-N based on the determined qualitative match score and the quantitative match score. In an embodiment, the qualitative fit of the one or more electronic devices 106A-N refers to an assessment of an impact and extensiveness of at least one of: network topologies and frequencies with regards to a support of the one or more electronic devices 106A-N with respect to the cellular network. In another embodiment, the quantitative fit of the one or more electronic devices 106A-N refers to presence or lack of at least one of: the network topologies, network technologies, and the frequencies to support a specific IMEI's modem profile on the cellular network within a country or a regional collection of a plurality of countries.

In an embodiment, the combination of the qualitative fit and the quantitative fit can be stated as a number. For example, as a percentage to indicate 100% compatibility, or 0% compatibility, or a level in-between, which refers that the compatibility system 102 determines the compatibility of the one or more electronic devices 106A-N, does not determine the compatibility of the one or more electronic devices 106A-N, and determination of what degree of compatibility the one or more electronic devices 106A-N may have as the one or more electronic devices 106A-N move from antenna to antenna in the mobile network's service area, respectively.

The compatibility system 102 further includes the value assigning subsystem 216 that is communicatively connected to the hardware processor 228. The value assigning subsystem 216 assigns values for the one or more electronic devices 106A-N based on at least one of: qualitative measurements and quantitative measurements to a supported spectrum and technological capability status of the one or more electronic devices 106A-N. The compatibility system 102 further includes the ranking subsystem 218 that is communicatively connected to the hardware processor 228. The ranking subsystem 218 rank for the one or more electronic devices 106A-N with the determined compatibility based on the values assigned to the one or more electronic devices 106A-N with respect to the at least one of: qualitative measurements and quantitative measurements. In an embodiment, the ranking, for the one or more electronic devices 106A-N results in a holistic assessment of suitability of the one or more electronic devices 106A-N to operate with the one or more mobile network operators 108A-N within a specific international region, country, or localized geographical location.

The compatibility system 102 further includes the grouping subsystem 220 that is communicatively connected to the hardware processor 228. The grouping subsystem 220 groups the one or more electronic devices 106A-N based on a category of the one of more electronic devices 106A-N that are ranked. Prior to group the one or more electronic devices 106A-N, the grouping subsystem 220 sorts the ranked one or more electronic devices 106A-N into strata. In an embodiment, the one or more ranked electronic devices 106A-N are grouped in a way to at least one of: optimize the value of the one or more electronic devices 106A-N, minimize transactional risk, and reduce environmental costs of business as the one or more electronic devices 106A-N are taken to markets via a transactional system.

The compatibility system 102 further includes the security subsystem 222 that is communicatively connected to the hardware processor 228. The security subsystem 222 secures information related to the determined compatibility of the one or more electronic devices 106A-N by encrypting the information. Further, the security subsystem 222 transmits the encrypted information related to the determined compatibility of the one or more electronic devices 106A-N from a first user to a second user. In an embodiment, the first user may be a service requesting party, and the second user may be a buyer or owner 110 of the one or more electronic devices 106A-N. In an embodiment, the security subsystem 222 further allows access of the information related to the determined compatibility of the one or more electronic devices 106A-N to the public using a pass key, a quick response (QR) code, which are embedded into different public-facing contents including at least one of: sales tags, PhoneSpection Reports, application programming interface (API) calls, application-based data services, and accessing services via an internet connection.

Figure 3:
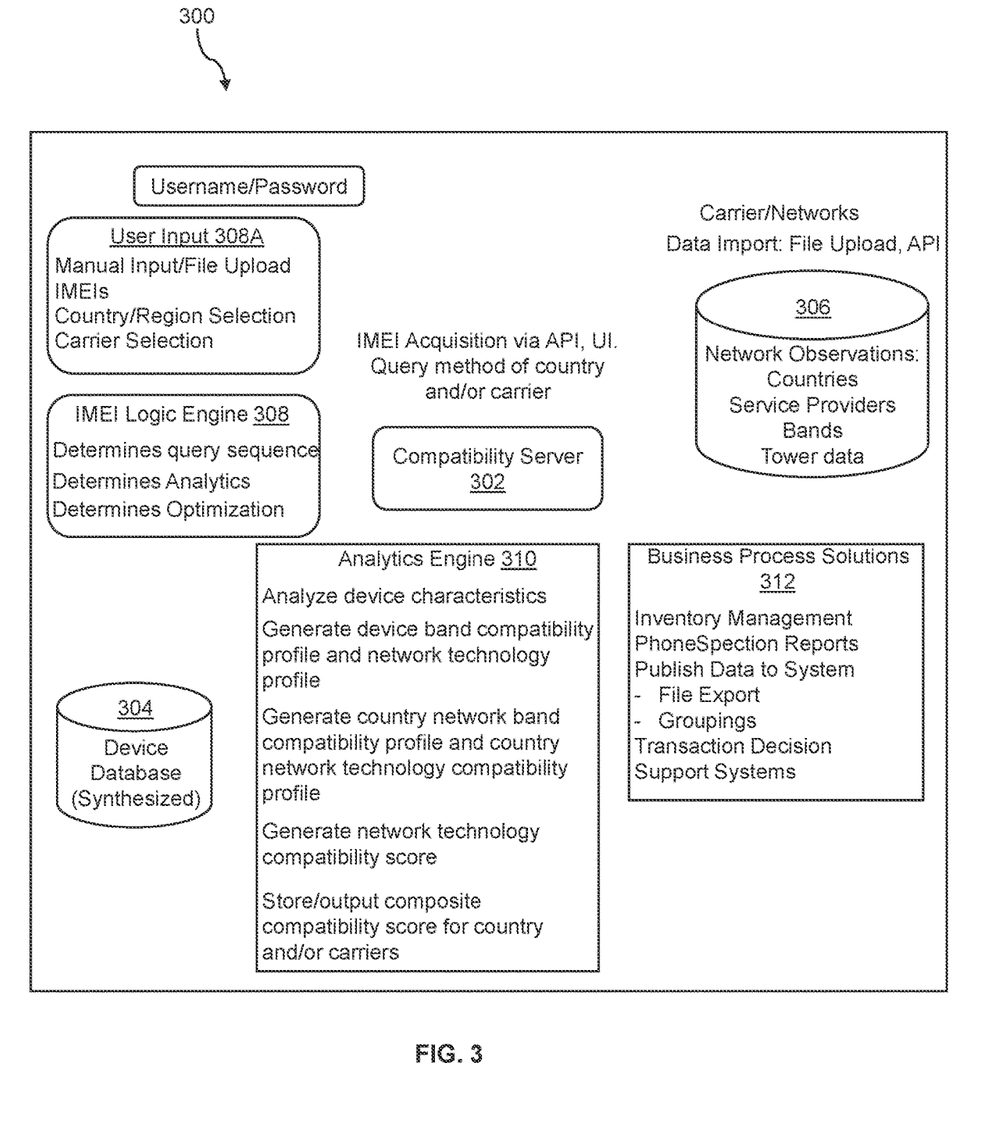
FIG. 3 is a schematic representation depicting determination of the technical compatibility of the one or more electronic devices and the carriers of the one or more mobile network operators, in accordance with an embodiment of the present disclosure.

FIG. 3 is a schematic representation 300 depicting determination of the technical compatibility of the one or more electronic devices 106A-N and the carriers of the one or more mobile network operators 108A-N, in accordance with an embodiment of the present disclosure. The compatibility system 102 may act as a compatibility server 302 that obtains data from the plurality of data sources (i.e., a database 304) of the one or more electronic devices 106A-N, and also from the plurality of data sources (i.e., a database 306) of the one or more mobile network operators 108A-N, in an embodiment, the database 304 is a synthesized data sets and the database 306 is unsynthesized data sets including primitive data. In an embodiment, networks present a multi-faceted data set as a network that may be operated across several countries, and each network may have different spectrum allocations. In another embodiment, the countries pursue regional multi-country spectrum harmonizing initiatives (i.e., EU) to facilitate roaming and interoperability.

In an embodiment, information related to the IMEIs, carriers, and the country/regions may be manually uploaded in the compatibility server 302. In an embodiment, the compatibility server 302 may obtain the information of IMEI through API, UI, and the like, and information about the country and carrier within the country from the one or more electronic devices 106A-N, and the one or more mobile network operators 108A-N, respectively. A user input 308A, in FIG. 3, represents a set of device identification points and corresponding network constraints to match against. The network constraints may be against a single carrier in one country (i.e., will the one or more electronic devices 106A-N work on the current one or more network operators 108A-N?) or across a set of countries (e.g., which countries in Europe should the user 110A-N try to sell the one or more electronic devices 106A-N into?).

The compatibility server 302 is connected to a IMEI logic engine 308 in order to determine at least one of: query sequence, analytics, and optimization. The IMEI logic engine 308 evaluates both the device item-based queries, but also includes optional queries including at least one of: lost/stolen checks, manufacturer locks (i.e., Find My iPhone, which essentially forces parts reclamation) and unpaid bills/financial encumbrances, which may be a clearance hurdle for the target market, and these queries may be varied based on the market. In an embodiment, the IMEI logic engine 308 may force a default "junk market" outcome. However, the query profile of the user 110A-N may be different from another user's profile. As such, the query sequence is context dependent, the factors to evaluate are context dependent, and these queries are combined together that allow for optimization of query costs as opposed to blindly running all potential queries in a sequence, regardless of the blocking outcome of a particular query.

Further, the compatibility server 302 is connected to an analytics engine 310 for (a) determining the device attributes of the one or more electronic devices 106A-N, and the network attributes of the one or more mobile network operators 108A-N, (b) generating device band compatibility profile and network technology profile, (c) generating country network band compatibility profile and country network technology compatibility profile, (d) generating network technology compatibility score, and (e) outputting composite compatibility score for country and carriers. The analytics engine 310 represents processing of the one or more electronic devices 106A-N based on the user's inputs across the logic of requesting user 110A-N using the IMEI logic engine 308 to (a) initiate the acquisition of attributes of each of the one or more electronic devices 106A-N, (b) determine item-based attributes that are invisible to the user's eye, and (c) compare the item-based attributes against the match target.

The analytics engine 310 evaluates the one or more electronic devices 106A-N against the target one or more network operators 108A-N as well as the target country and/or each additional target specified by the user 110A-N. Further, information about relative importance of match items are used to weight the importance of each attribute (i.e., similar to a multi-variate formula unique to each electronic device 106A-N/user 110A-N/target matching including attributes that are invisible to the human eye). Based on the outcomes of these multi-variate components, a compatibility score is generated as a quantifiable outcome with a threshold indicating a qualitative outcome (i.e., pass/fail). The outcome of each electronic device 106A-N/user 110A-N/target match instance is then passed to the business process solutions 312.

Further, the compatibility server 302 provides benefits through the business process solutions 312 including at least one of: inventory management, PhoneSpection reports, publishing of data to the compatibility system 102, transaction decision support systems, and the like. The business process solutions 312 represent the business activity that is achievable based on the outcomes of the match (i.e., sell the one or more electronic devices 106A-N to an appropriate and optimized market or initiate parts reclamation). The business process solutions 312 facilitate sale of individual or batches of the one or more electronic devices 106A-N to enable economic efficiencies. The business process solutions 312 further make information available to service-purchasing customer, as well as for end-users 110A-N to indicate device identification, compatibility matching and scoring and outcomes in a transparent yet secure way. The business process solutions 312 further facilitate customer processing with data extract and export of outcome report data.

Figure 4:
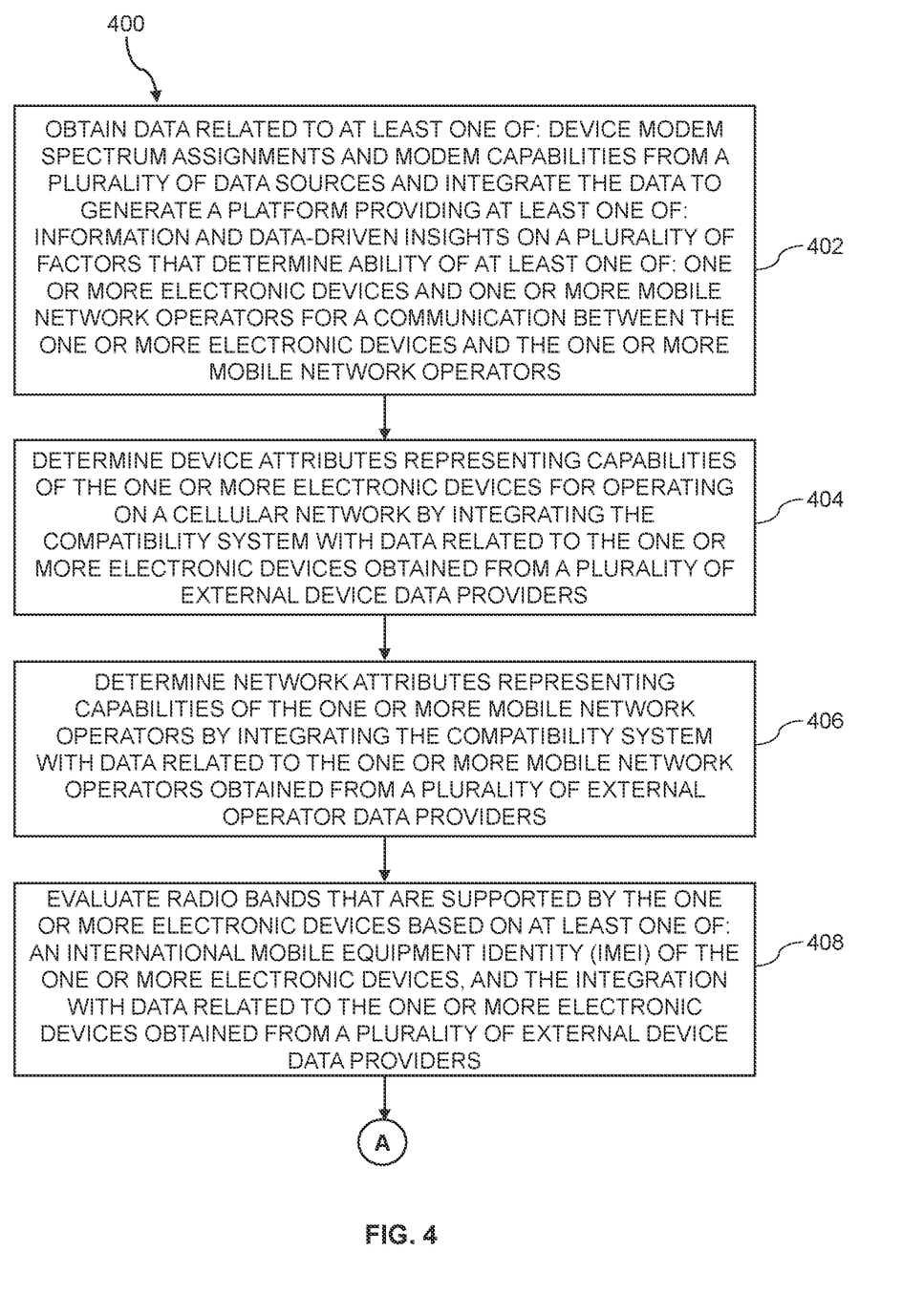
FIG. 4 is a computer implemented method illustrating a method for determining the technical compatibility of the one or more electronic devices and the carriers of one or more mobile network operators using the compatibility system, such as those shown in FIG. 1, in accordance with an embodiment of the present disclosure.

FIG. 4 is a computer implemented method illustrating a method 400 for determining the technical compatibility of the one or more electronic devices 106A-N and the carriers of one or more mobile network operators 108A-N using the compatibility system 102, such as those shown in FIG. 1, in accordance with an embodiment of the present disclosure. At step 402, data are obtained and integrated from the plurality of data sources to generate the platform providing at least one of: information and data-driven insights on a plurality of factors that determine ability of at least one of: one or more electronic devices 106A-N and one or more mobile network operators 108A-N for a communication between the one or more electronic devices 106A-N and the one or more mobile network operators 108A-N. At step 404, the device attributes representing capabilities of the one or more electronic devices 106A-N for operating on a cellular network are determined by integrating the compatibility system 102 with data related to the one or more electronic devices 106A-N obtained from a plurality of external device data providers.

At step 406, the network attributes representing capabilities of the one or more mobile network operators are determined by integrating the compatibility system 102 with data related to the one or more mobile network operators 108A-N obtained from a plurality of external operator data providers. At step 408, the radio bands supported by the one or more electronic devices are determined and evaluated based on at least one of: an international mobile equipment identity (IMEI) of the one or more electronic devices 106A-N, and the integration with data related to the one or more electronic devices 106A-N obtained from a plurality of external device data providers.

At step 410, the radio bands supported by the one or more mobile network operators 108A-N are determined and evaluated based on device information. At step 412, at least one of: a plurality of known potential carriers of the one or more mobile network operators 108A-N, and a plurality of known potential countries globally are identified to be compatible with the radio bands of the one or more electronic devices 106A-N. At step 414, the compatibility of at least one of: the one or more electronic devices 106A-N and the one or more mobile network operators 108A-N is determined by utilizing radio band capability data that comprise the radio bands supported by the one or more electronic devices 106A-N.

The present invention includes some advantages. The compatibility system 102 has benefits including transparently sharing the information of each electronic device 106 and group of the one or more electronic devices 106A-N to the one or more users 110A-N, mitigating device suitability risk and transactional risk, and creating vales to the one or more electronic devices 106A-N by assigning the values. The compatibility system 102 has ability to provide analytical functionality including at least one of assessing, analyzing, evaluating, ranking, recommending, sorting, grouping, and the like remotely via the API or other form of service call to upload IMEIs/files to the compatibility system 102. This multiplies the value of the compatibility system 102 by supporting virtual warehouse activities.

The compatibility system 102 automatically enables remote transactions by grouping the one or more electronic devices 106A-N by customizable count to be transacted, optimizing for the support of various market/buyer segments across geographical regions. The present invention enables the public conveyance of mobile network compatibility data at the localized location (i.e., neighborhood, city, state), country, and multi country regional level via the provisioning of the carrier compatibility and underlying source data (i.e., a confidential data set or document that is intended to be shared between buyer (i.e., the one or more users 110A-N) and seller, is usually inter-linked with other data or documents within a secure environment of a data or document repository).

To make the data public, the compatibility system 102 generates a unique data or a document key, which is used to identify, retrieve and display a safe public version of the data or document with the links to other confidential data and documents removed, by keeping only links to public data and documents or public versions of confidential data and documents. The data or the document key are shared with the public in the form of a uniform resource locator (URL), a quick response (QR) code, an access key, a document identity (ID), data ID instead of a reference to the confidential version of the data or document. The above said process allows making multiple private data or documents shareable at the same time and publish their safe public versions interlinked. The process can also be used to facilitate the verification of document authenticity, when the URL or the QR code link is included on a copy of a public document, allowing the document recipient to compare the copy of the document with its original version retrieved from online document repository via the document key.

Further, the compatibility system 102 can infer intelligent workflows from the device data compared against the carrier data in the country or the region, enabling intelligent direction and recommendations of outcome data sets, and thus influence workflows to maximize economic benefits, or to assist in management of inventory through the evaluation, sorting and grouping of device inventory and associated transactional costs. The Machine Learning (ML) algorithms and Artificial Intelligence (AI) are used to assist in these data insights may be particularly beneficial.

The compatibility system 102 utilizes the ML and AI approaches in multiple ways in implementation of the carrier compatibility service. The ML and AI approaches may include but not limited to a natural language processing and an unsupervised learning. The natural language processing is utilized to improve raw data filtering and attribute determination across disparate sources of data. The unsupervised learning approach is utilized to cluster and manage device inventory based on the compatibility. The compatibility system 102 further utilizes some other approaches including at least one of: (a) target location selection or find me the best market queries, and target location optimization including utilizing market metrics (i.e., GDP to offer ranking of target countries based on economic/demographic/technological attributes).

Further, the compatibility system 102 utilizes a supervised learning system (i.e., a prediction system) by which the device attributes are largely fixed. However, the varied and numerous contexts of network operation in an country within a region or cluster of countries setting are frequently evolving. As such, next months score of a given one or more electronic devices 106A-N is not predictable currently as new spectrum and infrastructure development is likely in the meantime (i.e., affecting future scores of the one or more electronic devices 106A-N). The present invention is about the compatibility system 102 system of sub-processes in which the device attributes are unknowable based on the facade of the one or more electronic devices 106A-N, the spectrum that is invisible to the human eye, and the global evolving population of known networks to match the one or more electronic devices 106A-N to the one or more network operators 108A-N based on data points at the present moment.

Further, the compatibility system 102 has the ability to assist in market suitability such as device compatibility with a specific carrier, with a specific carrier in a specific geographical region, overall compatibility in a country, collection of independent countries and countries co-located in the region. Further, the disparate or un-managed device inventory profiles may also be benefitted to ensure quality of service and suitability using the compatibility system 102.

Further, the present invention includes benefits of reducing transactional risk and environmental impact as the propensity for device returns to sellers because of network incompatibility are reduced resulting an appropriate device closer to an appropriate market from the earliest stages of the device trade-in process, and through every potential stage up to the sale to the end customer one or more users 110A-N). Additionally, the present invention includes the benefits of: (a) a reduction in the number of times the one or more electronic devices 106A-N are bought and sold between the point of original trade-in to end utilization in the hands of the one or more users 110A-N, (b) a reduction in the number of times the one or more electronic devices 106A-N must be returned to the seller (i.e., including packaging, re-packaging, shipping, and other incidental costs), (c) improved quality of the device utilization as a result of pairing or use on a more compatible one or more mobile network operators 108A-N, (d) increased trust in second-life mobile devices 106A-N (i.e., affecting device trade-in rates, building trust in second-life device market sellers and mobile devices 106A-N themselves, and reduced friction in the service engagement process in putting the mobile devices 106A-N into service on the one or more mobile network operator 108A-N networks).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-RAW) and DVD.

Input/output (I/O) devices (including but not limited to keyboards, displays, pointing devices, and the like.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like, of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A compatibility system for determining a technical compatibility of one or more electronic devices and one or more mobile network operators, the compatibility system comprising:
    a hardware processor; and
    a memory coupled to the hardware processor, wherein the memory comprises a set of program instructions in the form of a plurality of subsystems that are configured to be executed by the hardware processor, whereby the compatibility system is configured to:
        obtain data related to at least one of: device modem spectrum assignments and modem capabilities from a plurality of data sources and integrate the data to generate a platform providing at least one of: information and data-driven insights on a plurality of factors that determine ability of at least one of the one or more electronic devices and the one or more mobile network operators for a communication between the one or more electronic devices and the one or more mobile network operators;
        determine device attributes representing capabilities of the one or more electronic devices for operating on a cellular network by integrating the compatibility system with data related to the one or more electronic devices obtained from a plurality of external device data providers;
        determine network attributes representing capabilities of the one or more mobile network operators by integrating the compatibility system with data related to the one or more mobile network operators obtained from a plurality of external operator data providers;
        evaluate radio bands that are supported by the one or more electronic devices based on at least one of an international mobile equipment identity (IMEI) of the one or more electronic devices, and the integration with data related to the one or more electronic devices obtained from the plurality of external device data providers, wherein the radio bands are evaluated by combining the plurality of data sources that authoritatively and exhaustively represent the capabilities of the one or more electronic devices based on at least one of: spectrum usage, utilization of technologies for efficiency in connectivity;
        evaluate radio bands that are supported by the one or more mobile network operators based on device information;
        identify at least one of: a plurality of known potential carriers of the one or more mobile network operators, and a plurality of known potential countries globally, which are compatible with the radio bands of the one or more electronic devices;
        determine the compatibility of at least one of the one or more electronic devices and the one or more mobile network operators by utilizing radio band capability data that comprise the radio bands supported by the one or more electronic devices, wherein when the plurality of potential carriers of the one or more mobile network operators require a radio capability in provision of network access comprising at least one of: mobile roaming, activation of contract, and provisions of services to the one or more electronic devices, which enables evaluation of the one or more electronic devices to be utilized on any cellular network in the compatibility system.

2. The compatibility system of claim 1, wherein the compatibility system is further configured to determine at least one of: a qualitative match score and a quantitative match score for the one or more electronic devices based on the device attributes of the one or more electronic devices with respect to the network attributes of the one or more mobile network operators using a matching algorithm.

3. The compatibility system of claim 2, wherein the compatibility system is further configured to:
    measure at least one of qualitative fit and quantitative fit of the one or more electronic devices based on the determined qualitative match score and the quantitative match score, wherein the qualitative fit of the one or more electronic devices refers to an assessment of an impact and extensiveness of at least one of network topologies and frequencies with regards to a support of the one or more electronic devices with respect to the cellular network, and
    wherein the quantitative fit of the one or more electronic devices refers to presence or lack of at least one of: the network topologies, network technologies, and the frequencies to support a specific IMEI's modem profile on the cellular network within a country or a regional collection of a plurality of countries; and
    assign values for the one or more electronic devices based on at least one of qualitative measurements and quantitative measurements to a supported spectrum and technological capability status of the one or more electronic devices.

4. The compatibility system of claim 2, wherein the matching algorithm used to determine at least one of: the qualitative match score and the quantitative match score are multi-variate and adaptable as technical standards supported in at least one of: the one or more electronic devices, components comprising the device chipsets, and the modems of the one or more electronic devices, the one or more mobile network operators, components comprising antennae, spectrum, technologies of the one or more mobile network operators, and international standards governing global spectrum and technology use standards comprising 3GPP, European telecommunications standard institute (ETSI), international telecommunication union (ITU) are continue to evolve due to technological progress.

5. The compatibility system of claim 1, wherein the compatibility system is further configured to:
  rank for the one or more electronic devices with the determined compatibility based on the values assigned to the one or more electronic devices with respect to the at least one of: qualitative measurements and quantitative measurements, wherein ranking for the one or more electronic devices results in a holistic assessment of suitability of the one or more electronic devices to operate with the one or more mobile network operators within a specific international region, country, or localized geographical location; and
  group the one or more electronic devices based on a category of the one of more electronic devices that are ranked, wherein prior to group the one or more electronic devices, the ranked one or more electronic devices are sorted into strata.

6. The compatibility system of claim 1, wherein the compatibility system is further configured to:
  secure information related to the determined compatibility of the one or more electronic devices by encrypting the information; and
  transmit the encrypted information related to the determined compatibility of the one or more electronic devices from a first user to a second user, wherein the first user is a service requesting party, and a second user is a buyer of the one or more electronic devices.

7. The compatibility system of claim 6, wherein the compatibility system is further configured to allow access of the information related to the determined compatibility of the one or more electronic devices to public using a pass key, a quick response (QR) code, which are embedded into different public-facing contents comprising at least one of sales tags, PhoneSpection Reports, application programming interface (API) calls, application-based data services, and accessing services via an internet connection.

8. The compatibility system of claim 1, wherein the compatibility system is further configured to:
  identify points of spectrum compatibility of at least one of: the one or more electronic devices and the one or more network operators;
  identify points of non-spectrum compatibility of at least one of: the one or more network devices and the one or more mobile network operators to support standards-compliant transmission; and
  evaluate and provide a summary score indicating an overall output of device to network compatibility.

9. The compatibility system of claim 1, wherein
  the device attributes of the one or more electronic devices comprise at least one of: age of the one or more electronic devices, presence of the third generation partnership project (3GPP) standards supported by the device chipsets and modem, spectrum capabilities of the one or more electronic devices, and characteristics and attributes causing communication capabilities of the one or more electronic devices and
  the network attributes of the one or more mobile network operators comprise at least one of: spectrum utilization, presence of 3GPP technologies supported by the one or more mobile network operators and a network of broadcast antenna and tower infrastructure of the one or more mobile network operators; and characteristics and attributes causing communication capabilities of the one or more mobile network operators.

10. The compatibility system of claim 1, wherein the compatibility system identifies at least one of: a plurality of known potential carriers of the one or more mobile network operators; and a plurality of known potential countries globally using modem band data tables from the one or more electronic devices and data sources comprising of the device attributes that comprise at least one of: band data, network technologies, and technical capabilities of each electronic device in the compatibility system.

11. A method for determining a technical compatibility of one or more electronic devices and one or more mobile network operators, the method comprising:
  obtaining, by a hardware processor, data related to at least one of: device modem spectrum assignments and modem capabilities from a plurality of data sources and integrate the data to generate a platform providing at least one of information and data-driven insights on a plurality of factors that determine ability of at least one of: the one or more electronic devices and the one or more mobile network operators for a communication between the one or more electronic devices and the one or more mobile network operators;
  determining, by the hardware processor, device attributes representing capabilities of the one or more electronic devices for operating on a cellular network by integrating the compatibility system with data related to the one or more electronic devices obtained from a plurality of external device data providers;
  determining, by the hardware processor, network attributes representing capabilities of the one or more mobile network operators by integrating the compatibility system with data related to the one or more mobile network operators obtained from a plurality of external operator data providers;
  evaluating, by the hardware processor, radio bands that are supported by the one or more electronic devices based on at least one of: an international mobile equipment identity (IMEI) of the one or more electronic devices, and the integration with data related to the one or more electronic devices obtained from a plurality of external device data providers, wherein evaluating the radio bands comprises combining the plurality of data sources that authoritatively and exhaustively represent the capabilities of the one or more electronic devices based on at least one of: spectrum usage, utilization of technologies for efficiency in connectivity;
  evaluating, by the hardware processor, radio bands that are supported by the one or more mobile network operators based on device information;
  identifying, by the hardware processor, at least one of: a plurality of known potential carriers of the one or more mobile network operators, and a plurality of known potential countries globally, which are compatible with the radio bands of the one or more electronic devices;
  determining, by the hardware processor, the compatibility of at least one of: the one or more electronic devices and the one or more mobile network operators by utilizing radio band capability data that comprise the radio bands supported by the one or more electronic devices, wherein when the plurality of potential carriers of the one or more mobile network operators require a radio capability in provision of network access comprising at least one of: mobile roaming, activation of contract, and provisions of services to the one or more electronic devices, which enable evaluation of the one or more electronic device to be utilized on any cellular network in the compatibility system.

12. The method of claim 11, further comprising: determining, by the hardware processor, at least one of: a qualitative match score and a quantitative match score based on the device attributes of the one or more electronic devices with respect to the network attributes of the one or more mobile network operators using a matching algorithm.

13. The method of claim 12, further comprising:
measuring, by the hardware processor, at least one of: qualitative fit and quantitative fit of the one or more electronic devices based on the determined qualitative match score and the quantitative match score, wherein the qualitative fit of the one or more electronic devices refers to an assessment of an impact and extensiveness of at least one of: network topologies and frequencies with regards to a support of the one or more electronic devices with respect to the cellular network, and
wherein the quantitative fit of the one or more electronic devices refers to presence or lack of at least one of: the network topologies, network technologies, and the frequencies to support a specific IMEI's modem profile on the cellular network within a country or a regional collection of a plurality of countries; and
assigning, by the hardware processor, values for the one or more electronic devices based on at least one of: qualitative measurements and quantitative measurements to a supported spectrum and technological capability status of the one or more electronic devices.

14. The method of claim 12, wherein the matching algorithm used to determine at least one of: the qualitative match score and the quantitative match score are multivariate and adaptable as technical standards supported in at least one of: the one or more electronic devices, components comprising the device chipsets, and the modems of the one or more electronic devices, the one or more mobile network operators, components comprising antennae, spectrum, technologies of the one or more mobile network operators, and international standards governing global spectrum and technology use standards comprising 3GPP, European telecommunications standard institute (ETSI), international telecommunication union (ITU) are continue to evolve due to technological progress.

15. The method of claim 11, further comprising:
ranking, by the hardware processor, for the one or more electronic devices with the determined compatibility based on the values assigned to the one or more electronic devices with respect to the at least one of: qualitative measurements and quantitative measurements, wherein ranking for the one or more electronic devices results in a holistic assessment of suitability of the one or more electronic devices to operate with the one or more mobile network operators within a specific international region, country, or localized geographical location; and
grouping, by the hardware processor, the one or more electronic devices based on a category of the one of more electronic devices that are ranked, wherein prior to group the one or more electronic devices, the ranked one or more electronic devices are sorted into strata.

16. The method of claim 11, further comprising:
securing, by the hardware processor, information related to the determined compatibility of the one or more electronic devices by encrypting the information; and
transmitting, by the hardware processor, the encrypted information related to the determined compatibility of the one or more electronic devices from a first user to a second user, wherein the first user is a service requesting party, and a second user is a buyer of the one or more electronic devices.

17. The method of claim 16, further comprising: allowing, by the hardware processor, access of the information related to the determined compatibility of the one or more electronic devices to public using a pass key, a quick response (QR) code, which are embedded into different public-facing contents comprising at least one of: sales tags, PhoneSpection Reports, application programming interface (API) calls, application-based data services, and accessing services via an internet connection.

18. The method of claim 11, further comprising:
identifying, by the hardware processor, points of spectrum compatibility of at least one of: the one or more electronic devices and the one or more network operators;
identifying, by the hardware processor, points of non-spectrum compatibility of at least one of: the one or more network devices and the one or more mobile network operators to support standards-compliant transmission; and
evaluating and providing, by the hardware processor, a summary score indicating an overall output of device to network compatibility.

19. The method of claim 11, wherein identifying at least one of: a plurality of known potential carriers of the one or more mobile network operators, and a plurality of known potential countries globally using aggregated device modem band data tables and data sources comprising of attributes comprising at least one of: band data, network technologies, and technical capabilities of each electronic device in the compatibility system.

20. A non-transitory computer-readable storage medium having instructions stored therein that when executed by a hardware processor, cause the processor to execute operations of:
obtaining data related to at least one of: device modem spectrum assignments and modem capabilities from a plurality of data sources and integrate the data to generate a platform providing at least one of: information and data-driven insights on a plurality of factors that determine ability of at least one of: the one or more electronic devices and the one or more mobile network operators for a communication between the one or more electronic devices and the one or more mobile network operators;
determining device attributes representing capabilities of the one or more electronic devices for operating on a cellular network by integrating the compatibility system with data related to the one or more electronic devices obtained from a plurality of external device data providers;
determining network attributes representing capabilities of the one or more mobile network operators by integrating the compatibility system with data related to the one or more mobile network operators obtained from a plurality of external operator data providers;
evaluating radio bands that are supported by the one or more electronic devices based on at least one of: an international mobile equipment identity (IMEI) of the one or more electronic devices, and the integration with data related to the one or more electronic devices obtained from a plurality of external device data providers, wherein evaluating the radio bands comprises combining the plurality of data sources that authoritatively and exhaustively represent the capabilities of the one or more electronic devices based on at least one of: spectrum usage, utilization of technologies for efficiency in connectivity;

evaluating radio bands that are supported by the one or more mobile network operators based on device information;

identifying at least one of: a plurality of known potential carriers of the one or more mobile network operators, and a plurality of known potential countries globally, which are compatible with the radio bands of the one or more electronic devices;

determining the compatibility of at least one of: the one or more electronic devices and the one or more mobile network operators by utilizing radio band capability data of the one or more electronic devices, wherein when the plurality of potential carders of the one or more mobile network operators require a radio capability in provision of network access comprising at least one of: mobile roaming, activation of contract, and provisions of services to the one or more electronic devices, which enable evaluation of the one or more electronic device to be utilized on any cellular network in the compatibility system.

* * * * *